United States Patent [19]
Levien

[11] Patent Number: 5,917,614
[45] Date of Patent: Jun. 29, 1999

[54] METHOD AND APPARATUS FOR ERROR DIFFUSION SCREENING OF IMAGES WITH IMPROVED SMOOTHNESS IN HIGHLIGHT AND SHADOW REGIONS

[76] Inventor: Raphael L Levien, Rte. 1, Box 18, P.O. Box 31 (UPS), McDowell, Va. 24458

[21] Appl. No.: 07/983,211

[22] Filed: Nov. 30, 1992

[51] Int. Cl.$^6$ .................................................. G06K 9/34
[52] U.S. Cl. .......................................................... 358/456
[58] Field of Search ................................ 358/455, 456, 358/459, 448, 458, 445, 447, 446, 449, 450, 451, 452, 453, 454, 457, 460, 461, 462

[56] References Cited

U.S. PATENT DOCUMENTS

| | | |
|---|---|---|
| 5,055,942 | 10/1991 | Levien . |
| 5,208,684 | 5/1993 | Itoh .......................................... 358/456 |
| 5,243,443 | 9/1993 | Eschbach ................................ 358/455 |

OTHER PUBLICATIONS

Floyd, R.W. and L. Steinberg, "An Adaptive Algorithm for Spatial Grayscale", Proc. SID, vol. 17/2, pp. 75–77.

"Recent Progress in Digital Halftoning", Carrara, D. A., M. Analoui, and J.P. Allebach, Proc. IS & T Eighth International Congress on Advances in Non–Impact Printing Technologies, pp. 265–270, Oct. 92.

"Analysis of Threshold Modulation in Error Diffusion," Knox, T. and R. Eschbach, Proc. IS & T Eighth International Congresson Advances in Non–Impact Printing Technologies, pp. 280–282 Oct. 92.

"A Collision–based Model of Spiral Phyllotaxis", Fowler, D., P. Prusinkiewicz and J. Battjes, Siggraph '92 Conf. Proc, pp. 361–368 Jul. 92.

*Primary Examiner*—Sandra L. O'Shea
*Attorney, Agent, or Firm*—Allan Jacobson

[57] ABSTRACT

In an error diffusion halftone screen generation system, improved image smoothness in the highlight and shadow areas is obtained by calculating the distance to the nearest previously generated output dot. The square of the distance to the nearest previously generated dot is used as a bias value to effectively modulate the error diffusion threshold. The resulting output provides a halftone with a more uniform texture in the highlight and shadow areas of the screened image. The resulting pattern resembles the pattern of dots produced by tightly packing imaginary circles in the image plane, and placing an output dot at the center of each such tightly packed imaginary circle.

40 Claims, 5 Drawing Sheets

METHOD AND APPARATUS FOR ERROR DIFFUSION SCREENING OF IMAGES WITH IMPROVED SMOOTHNESS IN HIGHLIGHT AND SHADOW REGIONS

FIELD OF THE INVENTION

The present invention relates to halftone screening of images for photographic reproduction, and more particularly the present invention relates to an error diffusion method of generating screened halftones images in which the smoothness of the halftone in the highlight and shadow regions is improved.

BACKGROUND OF THE INVENTION

Images are typically stored in a memory representing tone values for each image pixel of the original image. For a black and white image, the stored image pixels represent the gray scale value corresponding to each pixel. For a color image, each color plane is stored as an array of image pixels each representing the tone value for each pixel of the image in each respective color plane. For example, if each of the pixels of a black and white image is represented by a 8 bit digital word, then the tone value for a given image pixel may be one of 256 values between the black level and the white level.

Continuous tone images do not print well on most printing devices where typically the absence or presence of the ink (or other marking indicia) on the paper is used to represent the printed image. In order to represent halftones (shades between the presence or absence of the printed ink), the original image is screened to produce a pattern, such as variable size dots which appear to the human eye as a halftone image.

In order to prepare a photograph for printing, it is first necessary to perform the step of halftone screening, which converts the continuous grayshades of the original into halftone dots of varying size and shape. Typically, these halftone dots are arranged on a regular grid of approximately 100 dots per inch. This spatial frequency is known as the screen ruling. Thus, one square inch of the final printed photograph will be composed of approximately 10,000 dots.

SCREEN GENERATION TO PRODUCE HALFTONES

Screening to produce halftone images is well known. The screen consists of an array of dots, or halftone cells, each of which represents one section of continuous tone in the original image as a single dot of variable size and shape. A halftone cell, in turn, consists of an array of smaller screen pixels, or samples, each having individual values against which the input pixels derived from the original image will be compared. The individual values of the smaller screen pixels, or samples, of the repeating halftone cell which form the variable dots is referred to as a spot function.

The halftone screening step consists of a screen pattern generating step, and a comparison step between the input image and the screen pattern. The screen is usually stored as a fairly small pattern that repeats itself or is repeatedly generated by programming. At any point where the original image is greater than the screen pattern, the output is marked. At any point where the image is not greater than the screen pattern, the output is not marked. In other words, if the value of the image pixel is greater than corresponding value of the screen cell, a mark (output pixel) is generated by the marking engine, whereas if the value of the image pixel is less or equal to the screen cell value, then no mark is generated by the marking engine, or vice versa. In this way, the final screened image, composed of dots, is produced. It should be understood that there are two levels of dots: the output pixels from the marking engine (marking dots), which at any point can be either black or white, but not an intermediate gray level (such devices include thermal transfer facsimile machines, laser electrostatic, and ink jet printers), and the variable size halftone dots which are composed of a plurality of adjacent output pixels of all one color. In the special case of a single isolated black output pixel in a background of white pixels, "dot" refers to both the marking dot and the halftone dot. Similarly, white single pixel dots on a black background can also be considered as dots, for the purpose of the present discussion.

ERROR DIFFUSION TO PRODUCE HALFTONES

Error diffusion, or adaptive dither techniques for halftone image generation are known. See Floyd, R. W., and L. Steinberg, "An Adaptive Algorithm For Spatial Grayscale", Proc. SID, vol. 17/2, pp. 75–77. In an error diffusion algorithm, the error introduced by marking each individual output pixel black or white (as compared to the desired image pixel grayshade), is diffused to neighboring output pixels. Typically, the difference between the output pixel (black or white) and the desired grayshade of the input pixel is accumulated in an error register. So long as the accumulated error is below a given threshold, the output pixel color is repeated. When the error register accumulates above the given threshold, the output switches to the opposite color, producing a compensating error in the opposite direction, to bring the accumulated error below the given threshold. Thus, over a portion of the image containing many output pixels, the average error is zero, thereby providing an output screened image.

Error diffusion screening does not produce the traditional dot pattern of halftone screens. In a traditional halftone screen, the halftone dots have a fixed periodic dot frequency (screen ruling) for all grayshade values. In an error diffusion system, the halftone dots do not have a fixed periodic frequency. In some error diffusion systems, grayshades are formed with very small dots which are too fine to be well reproduced by most marking or reproduction devices. In U.S. Pat. 5,055,942 to the present inventor, an error diffusion technique is disclosed in which the coarseness of the halftone is controllable by adjustment of a hysteresis constant. Dot size, and therefore the dot frequency is adjustable, resulting in halftones having somewhat different size dots within a range of different periodic dot frequencies.

Error diffusion techniques tend to perform poorly in highlight (very light) and shadow (very dark) regions, where they exhibit objectionable "worming" patterns. Highlight regions are defined as areas containing grayshades generally lighter than 15% gray, and shadow regions are defined as areas containing grayshades generally darker than 85% gray. In a highlight area, most of the marking dots, or indicia, are white; only a few dots are black. Worming patterns are characterized by output pixels which are closely clustered in one direction, but loosely clustered in the opposite direction. Robert Ulichney, in his book, "Digital Halftoning", The MIT Press, 1987, describes the effect mathematically as "anisotropy" in the Fourier spectra of the halftone images. The present invention is directed towards improving the smoothness, i.e., the uniformity of texture of the halftone in the highlight and shadow areas, and may be used in conjunction with most error diffusion techniques.

SUMMARY OF THE INVENTION

An improved texture is obtained in the highlight area of an error diffusion halftone by placing black pixels in the output image plane in a pattern corresponding to the centers of tightly packed imaginary circles. The radii of the imaginary circles control the gray value; the larger the radii, the lighter the grayshade. As the grayshade varies in different regions of the image, tightly packed circles of different radii are formed in the corresponding regions. In each case, a dot, i.e., a black output pixel, is placed at the center of each imaginary circle. In the shadow areas where most of the marking dots, or indicia, are black, and only a few dots are white, the reverse is obtained, i.e., white pixels are placed on a black background.

To obtain a uniform pattern of dots, typically single output pixels, arranged in an array as the centers of tightly packed imaginary circles, the distance to the nearest previously generated output dot is calculated. The calculated nearest dot distance value is used as a bias value, to be added to the value of the error diffusion term in an error diffusion system, which effectively modulates the threshold of the error diffusion algorithm. In the highlight areas, the distance to the nearest dot is large and changing rapidly, whereas the typical accumulated error diffusion term is small and changing slowly. Therefore, the effect of the nearest dot distance bias value in the highlight areas is dominant over the value of the error diffusion term, resulting in the desired pattern of dots placed in the centers of packed circles. However, in the darker and midtone areas of the image (outside of the highlight areas), the distance to the nearest dot is small, while the typical value of the error diffusion term is large, so that the effect of the added nearest dot distance bias value term on the error diffusion process is not significant. In between highlight and midtone areas, the transitions between grayshades is achieved smoothly, with the regular pattern in the highlight areas blending into the existing patterns of the base screening method forming the halftone dots in the midtone areas.

The present invention may be used in either or both of the highlight or shadow areas. However, because of the effect of dot gain (present in some types of reproduction systems, such as xerographic printing), in which dots tend to become enlarged when reproduced, the objectional effects of error diffusion is more pronounced in the highlight areas than in the shadow areas. Therefore, while the invention may be used in both the highlight and shadow areas, the improvement obtained by use of the present invention is more pronounced in the highlight areas.

DETAILED DESCRIPTION

Figure 3A:
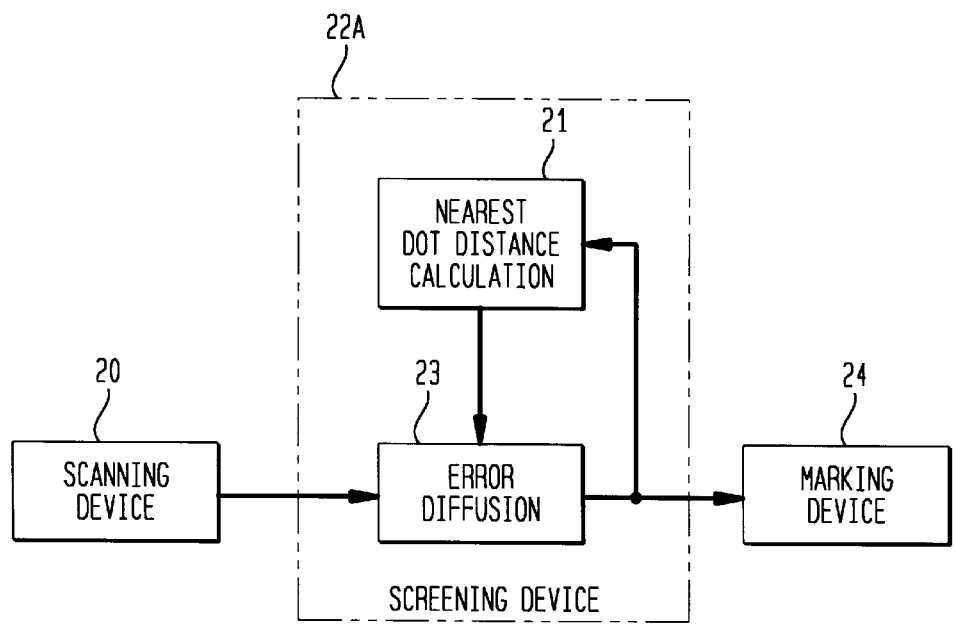
FIG. 3A is a block diagram of an error diffusion image screening system in accordance with the present invention.

An overview of an error diffusion screening system is shown in FIG. 3A. Scanning device 20 converts an original input image such as a photograph, into a plurality of input pixels for application to screening device 22A. The error diffusion module receives the input pixels from scanning device 20 and generates output pixels to marking device 24. The output pixels from the error diffusion module 23 to the marking device 24, are based in part on the accumulated past error between successive past input and output pixels. The error diffusion module 23 thereby diffuses the error between any given output pixel and corresponding input grayscale pixel value, to neighboring pixels in the output image.

In accordance with the present invention, the screening module includes a nearest dot calculation circuit 21, in which previous output pixels to marking device 24 are recorded in memory, and in which the distance to the nearest dot previously generated dot is calculated. A bias value based on the nearest prior dot distance calculation is input to the error diffusion module 23 to control the formation of marking dots in the highlight regions of the original image.

Figure 3B:
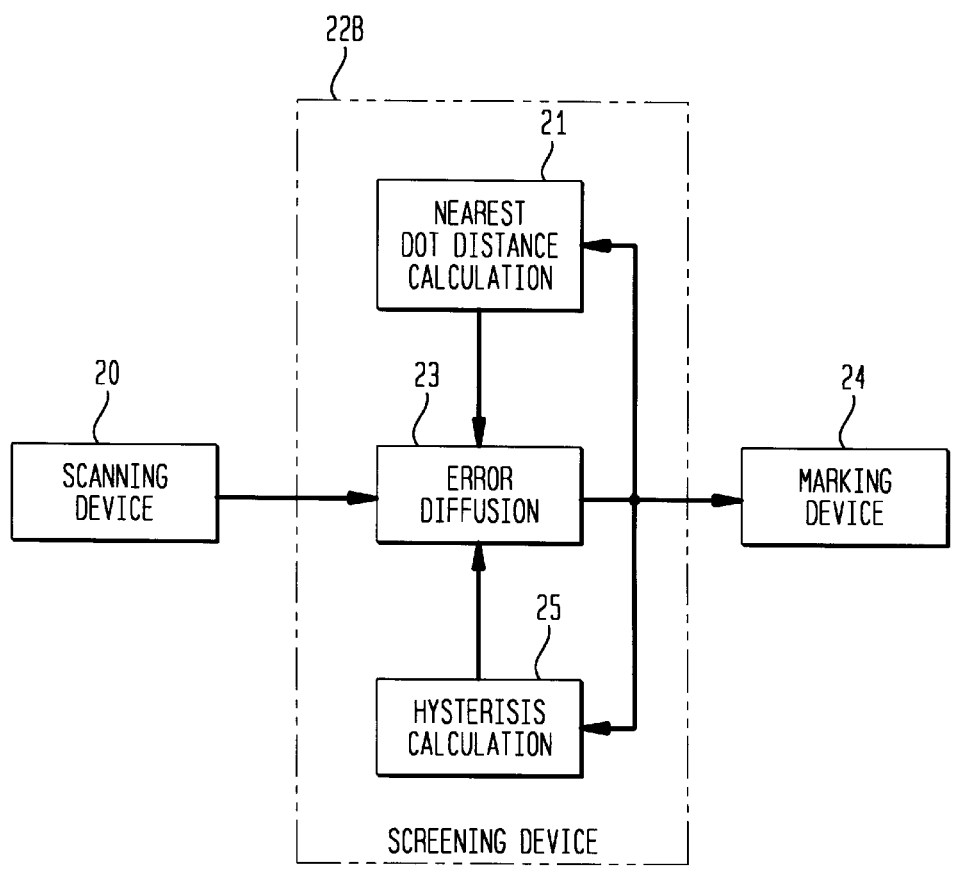
FIG. 3B is a block diagram of an error diffusion image screening system with hysteresis for controlling image coarseness used in conjunction with the present invention.

FIG. 3B is a block diagram of an alternate preferred embodiment of a halftone image screening system in accordance with the present invention. Screening device 22B includes an error diffusion module 23, a nearest dot distance calculation circuit 21, and also includes a hysteresis calculation 25. The hysteresis calculation provides a bias to the error diffusion module 23 to control the coarseness of the halftone dots formed by the marking device.

Figure 4:
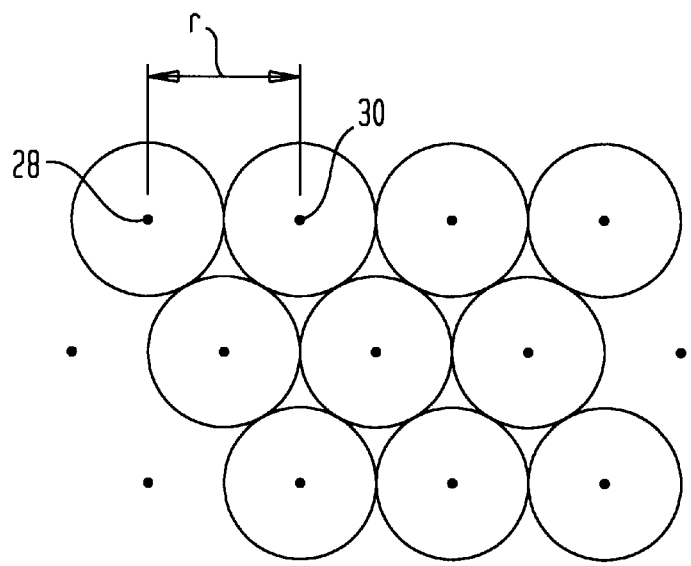
FIG. 4 is an illustration of pixels placed in a pattern corresponding to the centers of tightly packed imaginary circles in accordance with the present invention.

A dot pattern generated in accordance with the present invention is illustrated in FIG. 4. Black dots 28 and 30, which may be single output pixels or a group of adjacent output pixels, are placed in a uniform pattern. Each dot is spaced from neighboring dots by a fixed distance, r. Successive dots are placed in a pattern which corresponds to the centers of tightly packed imaginary circles. Although the pattern shown in FIG. 4 illustrates circles of the same size, it will be understood that as the grayshade changes, tightly packed circles of increasing or decreasing radius will define the position of the dots produced.

Figure 1:
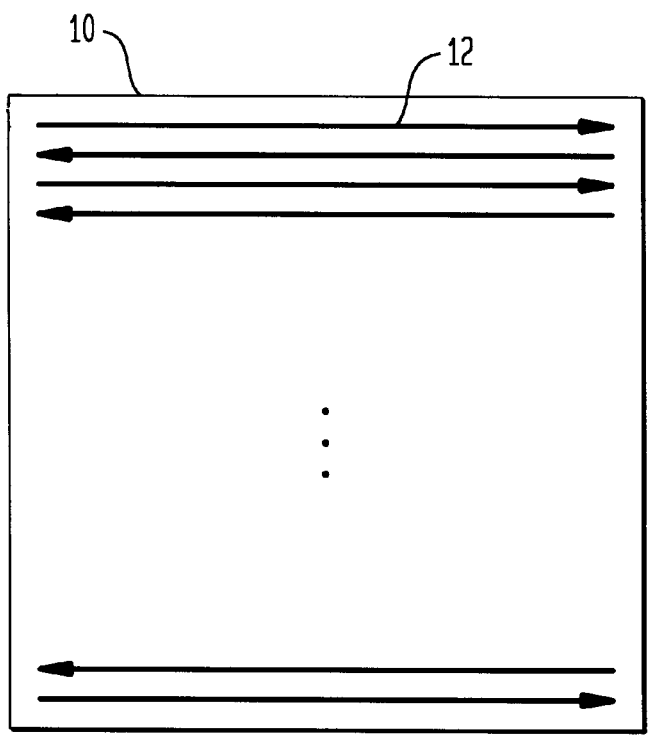
FIG. 1 illustrates an image plane which is scanned in accordance with a serpentine raster scan pattern.
Figure 2:
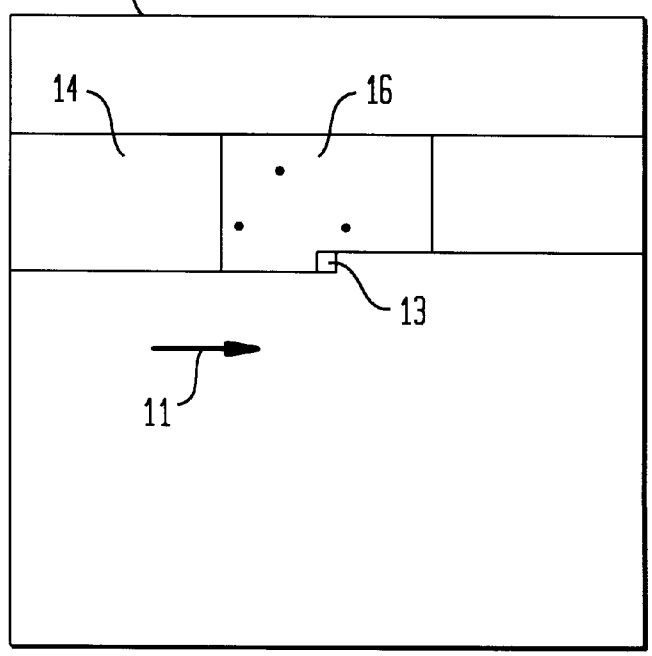
FIG. 2 illustrates a portion of the output image plane processed in accordance with the present invention.
Figure 5:
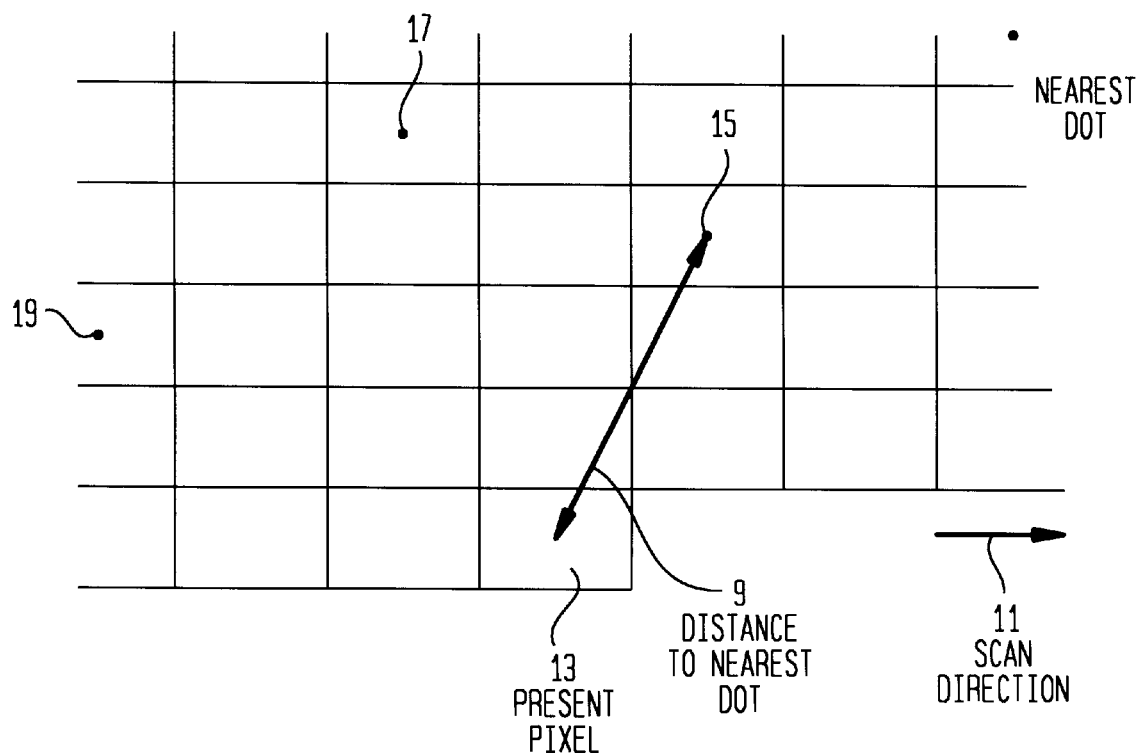
FIG. 5 is a detail diagram of a portion of FIG. 2 showing the previously generated output pixels forming the halftone output image in accordance with the present invention.

In the preferred embodiment as shown in FIG. 1, the image 10 is processed using a serpentine scan pattern 12. FIG. 2 shows a portion of the image processing in a band 14 composed of several horizontal scan lines. Both the horizontal band 14 and a region 16 of the previously generated output image is maintained in the memory of the previous generated output pixels. The current pixel 13, is located near the center of the last scan line 11 of region 16. As each present pixel 13 is processed, region 16 memory moves (slides) in the same direction along the current scan line. FIG. 5 illustrates in somewhat more detail, the region 16 of FIG. 2.

In FIG. 5, the present pixel 13 is illustrated along the progressive scan line 11. Previous output dots 15, 17 and 19 are shown. It is desired to calculate the distance from the present pixel 13 to each of the dots 15, 17 and 19, and to determine the minimum distance 9 to the nearest dot 15. The distance to the nearest dot may be calculated in any number of ways. One option is to compute the Euclidean distance for each pixel within some range of the present pixel. A second option is to conduct a spiral search for the nearest pixel. A fast hardware embodiment for determining the Euclidean distance, using shift register memory and lookup tables, is described in detail below with respect to FIG. 7. In addition, the Manhattan distance, i.e., the sum of the vertical and horizontal pixel displacement from the present pixel may be used to as a measure of distance to the nearest previously generated dot.

Figure 6:
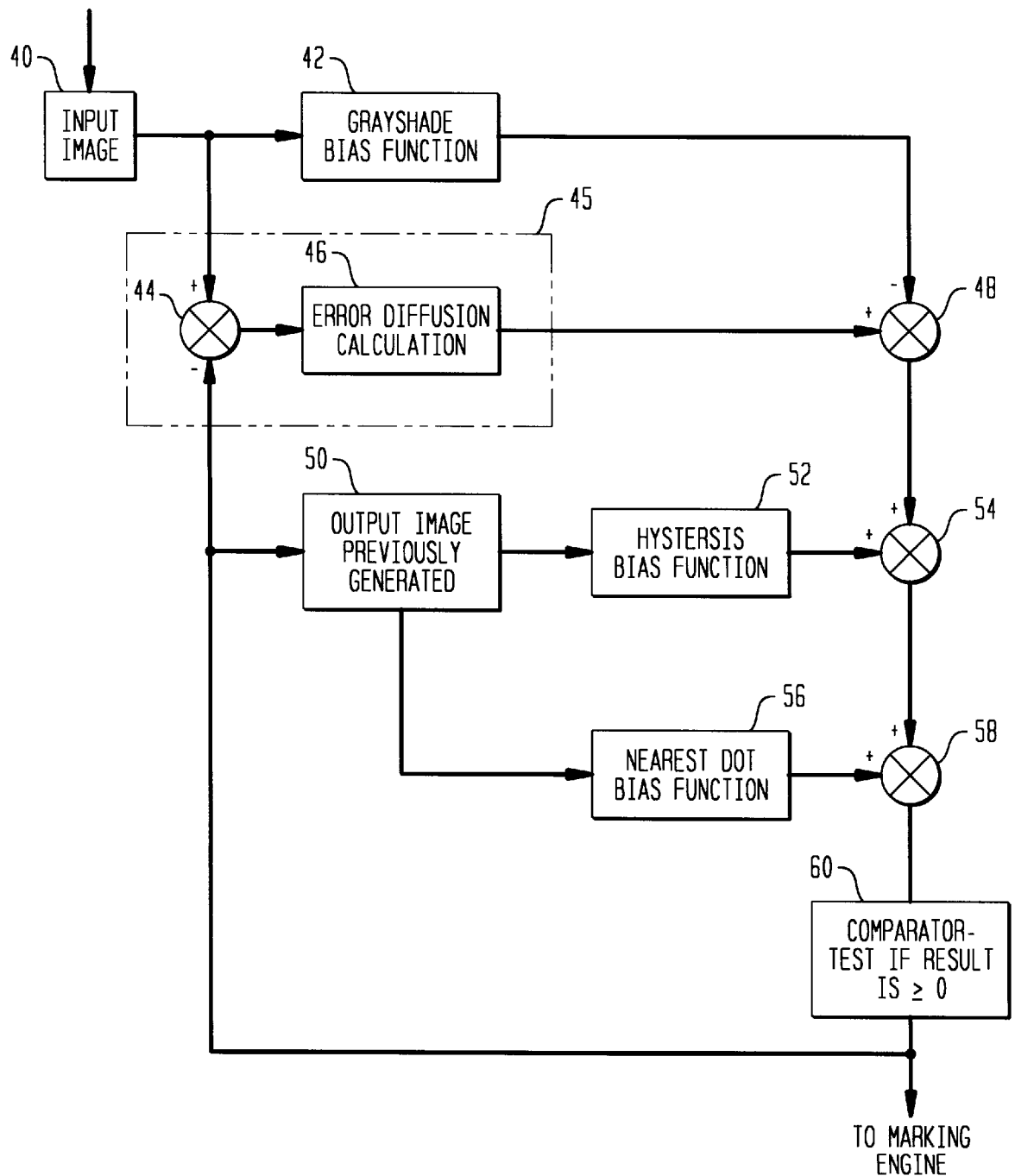
FIG. 6 is a block diagram of a halftone screening device embodying the present invention.

A block diagram of a screening device embodying the present invention is shown in FIG. 6. An input image buffer 40, which is a memory which holds the input image grayshade pixel values, is coupled to grayshade bias function generator 42, and to adder 44 of the error diffusion module 45. Error diffusion module 45 further includes an error diffusion calculation circuit 46, the output of which is an accumulated error term coupled to one input to adder 48. Output pixels, generated by threshold comparator 60 to the marking engine are recorded in a memory of the output image previously generated 50. Comparator 60 is a threshold comparator which compares the value of its input to zero, and has a first binary output for an input value greater than or equal to zero, and a second binary output for an input value less than zero. The two level binary output of threshold comparator 60 corresponds to the control signal to mark or not mark the output medium, respectively.

A hysteresis bias function generator 52, and a nearest dot bias function generator 56, are connected to the previously generated output image memory 50. Adders 48, 54, and 58 are arranged to algebraically sum the outputs of the grayshade bias function generator 42, the hysteresis bias generator 52 and the nearest dot bias generator 56, to the error term output of the error diffusion calculation circuit 46, to provide an input the threshold comparator 60. Without any of the bias terms, the error will converge so that the average error over the output image area is zero. With the bias terms included, the error converges so that the error plus the total bias hovers around zero. In this manner, the percentage of pixels marked black accurately approximates the grayshade of the input image.

Nearest dot bias: the search for circle packing

As indicated above, the present invention uses the previously generated pixel values to bias the threshold in an error diffusion algorithm. In particular, the Euclidean distance to the nearest previously generated dot is calculated, and some function of that distance is added as a bias to the error accumulation term to effectively modulate the threshold for determining the present pixel. One such function is $$\text{bias} = \frac{r^2}{16},$$

where the bias is the value added to modulate the threshold, and r is the distance to the nearest previously generated dot. This function has been chosen to affect highlights most strongly, quarter tones somewhat, and other tones very little, with a smooth blend in between. Other functions would also work, and experimental testing has shown a wide tolerance for different functions and scaling factors, without affecting the results very much.

In the highlight regions of an error diffusion halftone, the error changes rather slowly, especially at some distance from the dots. Thus, for a given gray value, the algorithm above will converge on the appropriate distance value between dots equal to r. A dot is marked whenever the error plus the bias actually crosses zero. Because the error changes smoothly, it is roughly the same at each point where a dot is generated. Therefore, each dot will be placed at nearly the same distance from other dots. This is, in fact, exactly the desired pattern, with imaginary packed circles of radius 2·r around each dot.

Hysteresis Bias: control over image coarseness

As disclosed in U.S. Pat. No. 5,055,942 to the present inventor, a "hysteresis" signal is used to control the coarseness of the screened halftone image. Specifically, two previously generated adjacent pixels, the immediately previous output pixel, and the output pixel above, are used to bias the error diffusion threshold for the next generated pixel. The hysteresis bias is added to the basic error term of the error diffusion algorithm. In simplified terms, if the adjacent dot is black, and the dot above is black, a bias is generated which will tend to make the current dot also black, until the accumulated error overcomes the hysteresis bias, to result in a white dot. Black pixels (larger values) effectively lower the threshold, so that it is more likely that the next pixel generated will be black. White pixels (smaller values) effectively raise the threshold, so that it is more likely that the next pixel generated will be white. Thus, pixels of like color become more clustered, and the resulting patterns are coarser. The coarseness of the resulting halftone image is controlled by an externally set parameter, the hysteresis constant, h. The hysteresis bias function generator 52 uses the stored values of the previous (adjacent) output pixel on the same scan line, and the prior scan line output pixel (above) stored in the memory of the output image previously generated 52 to compute the hysteresis bias for the present output pixel.

Grayshade bias: Additional bias terms to improve detail

The effect of adding signals to modulate the threshold of an error diffusion screening techniques, is equivalent to screening a "modified" image with the corresponding unbiased error diffusion method. The modified image consists of the original image plus a high-pass filtered version of the bias "image". In this case, the bias "image" is proportional to the distance between dots, which varies inversely with the gray tone (i.e. for a very light gray tone, the spacing between dots will be larger. If the bias varies directly with the image gray tone, the final halftone represents a high-pass filtered version of the image. In this case, because the bias signal is inversely proportional to the gray tone, the final halftone image will be low pass filtered, resulting in a loss of detail. Experimental results confirm the analysis.

To reclaim the lost detail, another bias term subtracted, which bias term is equal to the above bias function applied to the "expected" distance between dots for the present input gray value. The expected distance is inversely proportional to the square root of the gray value. Thus, $$r_{expected} = \sqrt{\frac{1}{g}}$$

Analysis suggests that the hysteresis bias will have a similar effect on the frequency content of the final halftone. Actually, the average hysteresis bias is equal to the gray value times twice the hysteresis, resulting in overall high-pass filtering. Again, this average, or expected, bias term is subtracted to counteract the changes in frequency response. In summary, the overall bias value is:

$$\text{total bias} = h \cdot (o_{previous} + o_{above} - 2g) + \frac{r^2}{16} - \frac{1}{16 \cdot g},$$

where h is the hysteresis setting, oprevious is the value of the previously generated pixel (0 for white, 1 for black), $o_{above}$ is the value of the pixel immediately above the present pixel, g is the input grayshade value (a fraction between 0 and 1), and r is the distance to the nearest previously generated dot, as above.

Image screening

In operation, successive input pixels from the input image memory 40 are coupled to the error diffusion module 45. The difference (present error) between the current input pixel and the current output pixel is determined by adder 44. The present error output from adder 44 is accumulated in the error diffusion calculation circuit 46. The error term output of the error diffusion calculation circuit 46 is proportional to the accumulated error resulting from prior output pixels generated from the marking engine. In addition, three bias terms discussed above forming the total bias above are summed with the error diffusion term. The grayshade bias from function generator 42 responsive to the input pixel grayshade from input image buffer 40, is added to the error diffusion term in adder 48. The hysteresis bias output from the function generator 52 is added to the generated error diffusion term and grayshade bias value in adder 54. The nearest dot bias from function generator 56 is added to the sum of the error calculation term and the other bias values (hysteresis and grayscale) in adder 58. As in U.S. Pat. No. 5,055,942, the sum of the bias and error diffusion term is compared with zero in threshold comparator 60. If the result of the comparison is non-negative, the output pixel is marked black. If the result of the comparison is negative, a white dot (not mark) is generated by the marking engine.

In either event, the present output pixel is stored in the previously generated output image memory, and the process is repeated for the next output pixel. Due to the parallel nature of the processing, screening speed is essentially limited by the gate delays during a single clock cycle per output pixel, resulting in very fast screening speeds.

Figure 7:
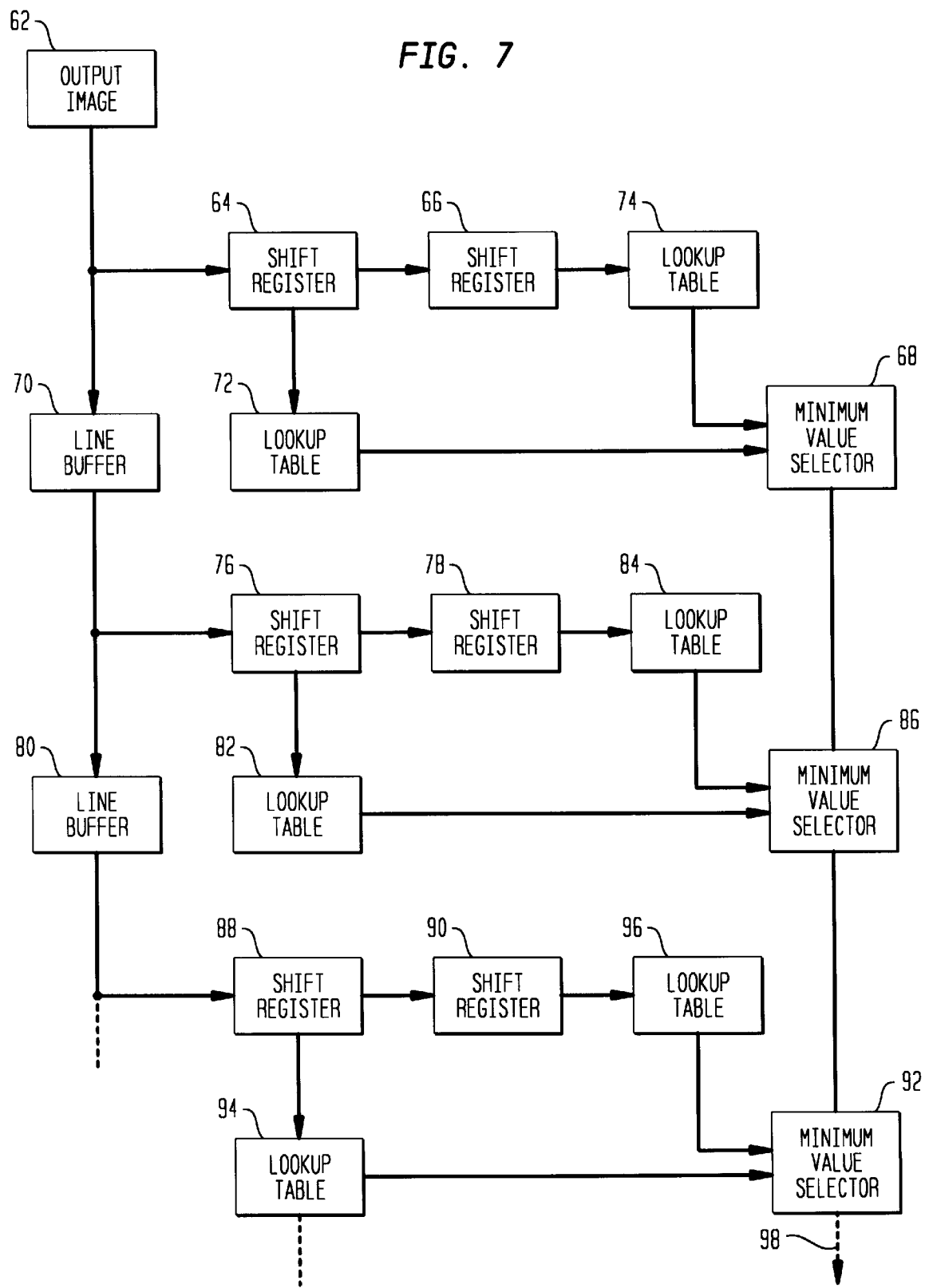
FIG. 7 is a block diagram of a hardware embodiment for computing the distance from the present pixel to the nearest previously generated pixel for use in accordance with the present invention.

A hardware implementation of the nearest dot distance calculation is shown in FIG. 7. A number of scan lines of the output image 62 are stored in successive line buffers 70, 80. For the stored lines, shift registers 64, 66, 76, 78, 88, 90 memorize a portion (say 16 bits) of each horizontal scan line. Each shift register is coupled to a corresponding lookup table 72, 74, 82, 84, 94 and 96. The output of lookup table 72 and lookup table 74 is coupled to a minimum value selector 68. The output of lookup table 82 and lookup table 84 is coupled to minimum value selector 86. The output of lookup table 94 and lookup table 96 is coupled to minimum value selector 92. The output of minimum value selector 68 is coupled to an input of minimum value selector 86. The output of minimum value selector 86 is coupled to an input to minimum value selector 92.

The minimum value selector circuits 68, 86 and 92 select the input which represents the minimum binary value of all the inputs. A minimum value selector may be constructed using comparators which compare each input, identify the minimum input, and enable suitable multiplexers, which then select the minimum value input for multiplexing to the output.

In operation, successive pixels of the output image 62 are memorized in the line buffers 70, 80. The shift registers such as 64 and 66 may be typically 8 bits wide each. Therefore, shift registers 64 and 66 together hold a 16 bit portion of one line of the previously generated output image. Shift registers 76 and shift register 78 hold a 16 bit portion of the prior line of the previously generated output image. The portion of the previously generated output image held in shift registers 64, 66, 76, 78, 88 and 90 correspond to the portion 16 of the output image 10 shown in FIG. 2.

For every possible distribution of previously generated output pixels (within the range of the line portions stored in shift registers 64, 66, 76, 78, 88, and 90), lookup tables 72, 74, 82, 84, 94 and 96 are programmed to contain the Euclidian distance to the nearest dot, and to output the corresponding distance to one of the respective minimum value selectors 68, 86 and 92. After each lookup table 72, 74, 82, 84, 94 and 96 selects the minimum distance to the nearest dot in its corresponding shift register memory 64, 66, 76, 78, 88 and 90, a further selection of the smallest of the minimum values is selected by the minimum value selectors 68, 86 and 92. The final output 98 from the nearest dot calculation circuit represents the distance from the present pixel to the nearest previously generated dot. If there is no previously generated output dot within range of the shift register memories, then the last minimum value selector in sequence is programmed to provide a predetermined maximum output for final output 98 representing the maximum distance between dots corresponding to the lightest shade of gray possible.

Size of highlight and shadow dots

Without any nearest dot bias, for certain hysteresis values (larger than approximately 0.375), highlight dots are no longer isolated pixels, even though isolated pixels may be desired. With a nearest dot bias as above, highlights become isolated pixels. The ability to generate isolated pixels is particularly important for many laser printers, in which isolated pixels are already considerably larger than one square resolution unit.

If it is desired that highlight dots should be larger than single pixels, then the distance to nearest dot calculation may be made blind to adjacent black pixels, i.e., to ignore certain adjacent pixels and compute the distance to the next nearest dot. The pattern of "blind pixels" will control both the size and shape of the maximum allowable highlight dot. For example, in a laser printer application, it may be desirable to have single pixel highlight dots, but to allow multiple pixel shadow dots. The latter effect is accomplished by incorporating two dot packing terms in the bias calculation, one each for highlight and shadow dots, and making the distance calculator for shadow dots blind to adjacent white pixels.

What is claimed is:

1. A method for producing a halftone image comprised of output pixels, said method comprising the steps of:

scanning a plurality of input points of an original image and generating a first plurality of input pixels, each input pixel having a numerical value representing a shade of gray for each input point scanned;

computing the error between a previous input pixel and a previous output pixel, to provide an error diffusion value;

computing a hysteresis contribution from at least one previous output pixel adjacent to the current output pixel, to provide a hysteresis bias value;

determining the distance to the nearest previously generated output pixel to provide a nearest dot bias value;

outputting a screened image having a second plurality of output pixels, each of said output pixels having one of two output states corresponding to marking or not marking an output dot on an output medium, each of said output pixels being determined responsive to the present input pixel, said error diffusion value, said hysteresis bias value and said nearest dot bias value; and transmitting signals representing said screened image to a marking device for marking said output pixels on said output medium.

2. A method in accordance with claim 1, wherein said step of determining the distance to the nearest previously generated output pixel includes calculating the Euclidian distance from the present pixel to said nearest previously generated output pixel.

3. A method in accordance with claim 1, wherein said step of determining the distance to the nearest previously generated output pixel to provide said nearest dot bias value, includes computing said nearest dot bias value by computing the square of the distance from said present pixel to said nearest previously generated output pixel.

4. A method in accordance with claim 1, wherein said step of determining the distance to the nearest previously generated output pixel to provide a nearest dot bias value includes:

storing a predetermined number of said previous output pixels in a memory; and providing a lookup table responsive to said memory, said lookup table providing an output indication representing the distance from the present output pixel to the nearest previous output pixel stored in said memory.

5. A method in accordance with claim 4, further including a plurality of memories and a plurality of lookup tables responsive to said plurality of memories, each of said plurality of lookup tables providing an output indication representing the distance from the present output pixel to a previous output pixel stored in a corresponding one of said plurality of memories, and wherein said method further comprises:

selecting one output of said plurality of lookup tables as the output indication representing the minimum distance from the present output pixel to the nearest previous output pixel stored in said plurality of memories.

6. A method for producing a halftone image comprised of output pixels, said method comprising the steps of:

scanning a plurality of input points of an original image and generating a first plurality of input pixels, each input pixel having a numerical value representing a shade of gray for each input point scanned;

computing the error between a previous input pixel and a previous output pixel, to provide an error diffusion value;

determining the distance to the nearest previously generated output pixel to provide a nearest dot bias value;

outputting a screened image having a second plurality of output pixels, each of said output pixels having one of two output states corresponding to marking or not marking an output dot on an output medium, each of said output pixels being determined responsive to the present input pixel, said error diffusion value and said nearest dot bias value; and transmitting signals representing said screened image to a marking device for marking said output pixels on said output medium.

7. A method in accordance with claim 6, wherein said step of determining the distance to the nearest previously generated output pixel includes calculating the Euclidian distance from the present pixel to said nearest previously generated output pixel.

8. A method in accordance with claim 6, wherein said step of determining the distance to the nearest previously generated output pixel to provide said nearest dot bias value, includes computing said nearest dot bias value by computing the square of the distance from said present pixel to said nearest previously generated output pixel.

9. A method in accordance with claim 6, wherein said step of determining the distance to the nearest previously generated output pixel to provide a nearest dot bias value includes:

storing a predetermined number of said previous output pixels in a memory; and providing a lookup table responsive to said memory, said lookup table providing an output indication representing the distance from the present output pixel to the nearest previous output pixel stored in said memory.

10. A method in accordance with claim 9, further including a plurality of memories and a plurality of lookup tables responsive to said plurality of memories, each of said plurality of lookup tables providing an output indication representing the distance from the present output pixel to a previous output pixel stored in a corresponding one of said plurality of memories, and wherein said method further comprises:

selecting one output of said plurality of lookup tables as the output indication representing the minimum distance from the present output pixel to the nearest previous output pixel stored in said plurality of memories.

11. In a system method for producing a halftone image comprised of output pixels, said system including scanning a plurality of input points of an original image and generating a first plurality of input pixels, said system further including computing the error between a previous input pixel and a previous output pixel to provide an error diffusion value and outputting a screened image having a second plurality of output pixels, each of said output pixels being determined responsive to the present input pixel and said error diffusion value, an improvement comprising:

determining the distance to the nearest previously generated output pixel to provide a nearest dot bias value;

outputting said screened image, wherein each of said output pixels is determined responsive to said present input pixel, said error diffusion value and said nearest dot bias value; and transmitting signals representing said screened image to a marking device for marking said output pixels on said output medium.

12. A method in accordance with claim 11, wherein said step of determining the distance to the nearest previously generated output pixel includes calculating the Euclidian distance from the present pixel to said nearest previously generated output pixel.

13. A method in accordance with claim 11, wherein said step of determining the distance to the nearest previously generated output pixel to provide said nearest dot bias value, includes computing said nearest dot bias value by computing the square of the distance from said present pixel to said nearest previously generated output pixel.

14. A method in accordance with claim 11, wherein said step of determining the distance to the nearest previously generated output pixel to provide a nearest dot bias value includes:

storing a predetermined number of said previous output pixels in a memory; and providing a lookup table responsive to said memory, said lookup table providing an output indication representing the distance from the present output pixel to the nearest previous output pixel stored in said memory.

15. A method in accordance with claim 14, further including a plurality of memories and a plurality of lookup tables responsive to said plurality of memories, each of said plurality of lookup tables providing an output indication representing the distance from the present output pixel to a previous output pixel stored in a corresponding one of said plurality of memories, and wherein said method further comprises:

selecting one output of said plurality of lookup tables as the output indication representing the minimum distance from the present output pixel to the nearest previous output pixel stored in said plurality of memories.

16. A method for producing a halftone image comprised of output pixels, said method comprising the steps of:

scanning a plurality of input points of an original image and generating a first plurality of input pixels, each input pixel having a numerical value representing a shade of gray for each input point scanned;

outputting a screened image having a second plurality of output pixels, each of said output pixels having one of two output states corresponding to marking or not marking an output dot on an output medium, each of said output pixels being determined responsive to the present input pixel, the error between a previous input pixel and a previous output pixel, and the distance to the nearest previously generated output pixel; and transmitting signals representing said screened image to a marking device for marking said output pixels on said output medium.

17. A method in accordance with claim 16, wherein said step of determining the distance to the nearest previously generated output pixel includes calculating the Euclidian distance from the present pixel to said nearest previously generated output pixel.

18. A method in accordance with claim 16, wherein said step of determining the distance to the nearest previously generated output pixel to provide said nearest dot bias value, includes computing said nearest dot bias value by computing the square of the distance from said present pixel to said nearest previously generated output pixel.

19. A method in accordance with claim 16, wherein said step of determining the distance to the nearest previously generated output pixel to provide a nearest dot bias value includes:

storing a predetermined number of said previous output pixels in a memory; and providing a lookup table responsive to said memory, said lookup table providing an output indication representing the distance from the present output pixel to the nearest previous output pixel stored in said memory.

20. A method in accordance with claim 19, further including a plurality of memories and a plurality of lookup tables responsive to said plurality of memories, each of said plurality of lookup tables providing an output indication representing the distance from the present output pixel to a previous output pixel stored in a corresponding one of said plurality of memories, and wherein said method further comprises:

selecting one output of said plurality of lookup tables as the output indication representing the minimum distance from the present output pixel to the nearest previous output pixel stored in said plurality of memories.

21. An apparatus for producing a halftone image comprised of output pixels, said apparatus comprising the steps of:

means for scanning a plurality of input points of an original image and generating a first plurality of input pixels, each input pixel having a numerical value representing a shade of gray for each input point scanned;

means for computing the error between a previous input pixel and a previous output pixel, to provide an error diffusion value;

means for computing a hysteresis contribution from at least one previous output pixel adjacent to the current output pixel, to provide a hysteresis bias value;

means for determining the distance to the nearest previously generated output pixel to provide a nearest dot bias value;

means for outputting a screened image having a second plurality of output pixels, each of said output pixels having one of two output states corresponding to marking or not marking an output dot on an output medium, each of said output pixels being determined responsive to the present input pixel, said error diffusion value, said hysteresis bias value and said nearest dot bias value; and means for transmitting signals representing said screened image to a marking device for marking said output pixels on said output medium.

22. An apparatus in accordance with claim 21, wherein said means for determining the distance to the nearest previously generated output pixel includes means for calculating the Euclidian distance from the present pixel to said nearest previously generated output pixel.

23. An apparatus in accordance with claim 21, wherein said means for determining the distance to the nearest previously generated output pixel to provide said nearest dot bias value, includes means for computing said nearest dot bias value by computing the square of the distance from said present pixel to said nearest previously generated output pixel.

24. An apparatus in accordance with claim 21, wherein said means for determining the distance to the nearest previously generated output pixel to provide a nearest dot bias value includes:

means for storing a predetermined number of said previous output pixels in a memory; and means for providing a lookup table responsive to said memory, said lookup table providing an output indication representing the distance from the present output pixel to the nearest previous output pixel stored in said memory.

25. An apparatus in accordance with claim 24, further including a plurality of memories and a plurality of lookup tables responsive to said plurality of memories, each of said plurality of lookup tables providing an output indication representing the distance from the present output pixel to a previous output pixel stored in a corresponding one of said plurality of memories, and wherein said apparatus further comprises:

means for selecting one output of said plurality of lookup tables as the output indication representing the minimum distance from the present output pixel to the nearest previous output pixel stored in said plurality of memories.

26. An apparatus for producing a halftone image comprised of output pixels, said apparatus comprising the steps of:

means for scanning a plurality of input points of an original image and generating a first plurality of input pixels, each input pixel having a numerical value representing a shade of gray for each input point scanned;

means for computing the error between a previous input pixel and a previous output pixel, to provide an error diffusion value;

means for determining the distance to the nearest previously generated output pixel to provide a nearest dot bias value;

means for outputting a screened image having a second plurality of output pixels, each of said output pixels having one of two output states corresponding to marking or not marking an output dot on an output medium, each of said output pixels being determined responsive to the present input pixel, said error diffusion value and said nearest dot bias value; and means for transmitting signals representing said screened image to a marking device for marking said output pixels on said output medium.

27. An apparatus in accordance with claim 26, wherein said means for determining the distance to the nearest previously generated output pixel includes means for calculating the Euclidian distance from the present pixel to said nearest previously generated output pixel.

28. An apparatus in accordance with claim 26, wherein said means for determining the distance to the nearest previously generated output pixel to provide said nearest dot bias value, includes means for computing said nearest dot bias value by computing the square of the distance from said present pixel to said nearest previously generated output pixel.

29. An apparatus in accordance with claim 26, wherein said means for determining the distance to the nearest previously generated output pixel to provide a nearest dot bias value includes:

means for storing a predetermined number of said previous output pixels in a memory; and means for providing a lookup table responsive to said memory, said lookup table providing an output indication representing the distance from the present output pixel to the nearest previous output pixel stored in said memory.

30. An apparatus in accordance with claim 29, further including a plurality of memories and a plurality of lookup tables responsive to said plurality of memories, each of said plurality of lookup tables providing an output indication representing the distance from the present output pixel to a previous output pixel stored in a corresponding one of said plurality of memories, and wherein said apparatus further comprises:

means for selecting one output of said plurality of lookup tables as the output indication representing the minimum distance from the present output pixel to the nearest previous output pixel stored in said plurality of memories.

31. In a system method for producing a halftone image comprised of output pixels, said system including scanning a plurality of input points of an original image and generating a first plurality of input pixels, said system further including computing the error between a previous input pixel and a previous output pixel to provide an error diffusion value and outputting a screened image having a second plurality of output pixels, each of said output pixels being determined responsive to the present input pixel and said error diffusion value, an improvement comprising:

means for determining the distance to the nearest previously generated output pixel to provide a nearest dot bias value;

means for outputting said screened image, wherein each of said output pixels is determined responsive to said present input pixel, said error diffusion value and said nearest dot bias value; and means for transmitting signals representing said screened image to a marking device for marking said output pixels on said output medium.

32. An apparatus in accordance with claim 31, wherein said means for determining the distance to the nearest previously generated output pixel includes means for calculating the Euclidian distance from the present pixel to said nearest previously generated output pixel.

33. An apparatus in accordance with claim 31, wherein said means for determining the distance to the nearest previously generated output pixel to provide said nearest dot bias value, includes means for computing said nearest dot bias value by computing the square of the distance from said present pixel to said nearest previously generated output pixel.

34. An apparatus in accordance with claim 31, wherein said means for determining the distance to the nearest previously generated output pixel to provide a nearest dot bias value includes:

means for storing a predetermined number of said previous output pixels in a memory; and means for providing a lookup table responsive to said memory, said lookup table providing an output indication representing the distance from the present output pixel to the nearest previous output pixel stored in said memory.

35. An apparatus in accordance with claim 34, further including a plurality of memories and a plurality of lookup tables responsive to said plurality of memories, each of said plurality of lookup tables providing an output indication representing the distance from the present output pixel to a previous output pixel stored in a corresponding one of said plurality of memories, and wherein said apparatus further comprises:

means for selecting one output of said plurality of lookup tables as the output indication representing the minimum distance from the present output pixel to the nearest previous output pixel stored in said plurality of memories.

36. An apparatus for producing a halftone image comprised of output pixels, said apparatus comprising the steps of:

means for scanning a plurality of input points of an original image and generating a first plurality of input pixels, each input pixel having a numerical value representing a shade of gray for each input point scanned;

means for outputting a screened image having a second plurality of output pixels, each of said output pixels having one of two output states corresponding to marking or not marking an output dot on an output medium, each of said output pixels being determined responsive to the present input pixel, the error between a previous input pixel and a previous output pixel, and the distance to the nearest previously generated output pixel; and means for transmitting signals representing said screened image to a marking device for marking said output pixels on said output medium.

37. An apparatus in accordance with claim 36, wherein said means for determining the distance to the nearest previously generated output pixel includes means for calculating the Euclidian distance from the present pixel to said nearest previously generated output pixel.

38. An apparatus in accordance with claim 36, wherein said means for determining the distance to the nearest previously generated output pixel to provide said nearest dot bias value, includes means for computing said nearest dot bias value by computing the square of the distance from said present pixel to said nearest previously generated output pixel.

39. An apparatus in accordance with claim 36, wherein said means for determining the distance to the nearest previously generated output pixel to provide a nearest dot bias value includes:

means for storing a predetermined number of said previous output pixels in a memory; and means for providing a lookup table responsive to said memory, said lookup table providing an output indication representing the distance from the present output pixel to the nearest previous output pixel stored in said memory.

40. An apparatus in accordance with claim 39, further including a plurality of memories and a plurality of lookup tables responsive to said plurality of memories, each of said plurality of lookup tables providing an output indication representing the distance from the present output pixel to a previous output pixel stored in a corresponding one of said plurality of memories, and wherein said apparatus further comprises:

means for selecting one output of said plurality of lookup tables as the output indication representing the minimum distance from the present output pixel to the nearest previous output pixel stored in said plurality of memories.

* * * * *